TDM CONFERENCE CONTROL CIRCUIT FEATURING CROSSTALK REDUCTION BY CHANGING THE SEQUENCE OF STATION INTERCONNECTIONS

Filed March 14, 1967 3 Sheets-Sheet 1

INVENTORS W. B. GAUNT, JR.
D. A. HARMS
BY
R. C. Winter
ATTORNEY

Feb. 10, 1970 W. B. GAUNT, JR., ET AL 3,495,041

TDM CONFERENCE CONTROL CIRCUIT FEATURING CROSSTALK REDUCTION BY CHANGING THE SEQUENCE OF STATION INTERCONNECTIONS

Filed March 14, 1967 3 Sheets-Sheet 3

3,495,041

TDM CONFERENCE CONTROL CIRCUIT FEATURING CROSSTALK REDUCTION BY CHANGING THE SEQUENCE OF STATION INTERCONNECTIONS

Wilmer B. Gaunt, Jr., Boxford, Mass., and David A. Harms, Wheaton, Ill., assignors to Bell Telephone Laboratories, Incorporated, Murray Hill, N.J., a corporation of New York Filed Mar. 14, 1967, Ser. No. 622,954
Int. Cl. H04j 3/02
U.S. Cl. 179—15 13 Claims

ABSTRACT OF THE DISCLOSURE

A circuit is described which controls connections between a multiport conference circuit and stations engaged in a conference through a common communication bus in a time division communication system. A conference address is inserted in a plurality of stores, said stores controlling line connections in a mutually precessing sequence. The occurrence of the conference address is detected in order to augment counters corresponding to the stores so that conference circuit ports assigned to each store are successively connected to the common communication bus.

This invention relates to conference arrangements in communication systems and more particularly to electronic circuits for controlling conference arrangements using time division switching.

Time division switching is employed in present day communication systems to permit concurrent exchange of information between pairs of active stations over a common communication bus. Pairs of station lines are connected in successive short time intervals in a repetitive cycle. During each time interval or time slot, a sample of information energy may be transferred between a pair of stations. By sampling at a sufficiently rapid rate and by using proper transmission and filtering arrangements, relatively lossless transfer of the sampled information energy over the common communication bus may be achieved. A relatively faithful reproduction of the information may thereby be transmitted between said pairs of stations.

Conference arrangements for interconnecting more than two stations in a time division switching system are in use which utilize intermediate storage cells to temporarily store the sampled information energy in repetitive cycles of a time division switching system. During each repetitive cycle, sampled information energy may, in accordance with one method, be transferred from a first station to the intermediate store. A portion of this sampled information may then be transferred to a second station during another time slot and the remaining portion may be transferred to yet another station during a third time slot. In this manner sampled information energy may be exchanged among more than two stations. Such a system is disclosed in the copending application of W. B. Gaunt, Jr., Ser. No. 334,453, filed Dec. 30, 1963, now U.S. Patent No. 3,319,005, issued May 9, 1967. It is characteristic of such methods that only a portion of the sampled information from a station may be transferred to each of the other stations engaged in a conference in a repetitive cycle. Thus a loss in the information transferred cannot be avoided.

A different method has been proposed in the copending application of W. B. Gaunt, Jr., Ser. No. 421,316, filed Dec. 28, 1964, now U.S. Patent No. 3,423,538, issued Jan. 21, 1969. A closed ring of cascaded amplifiers effects a transfer of sampled information among a plurality of connected stations via time division sampling switches and a common communication bus in selected time slots. By maintaining the gain of each amplifier at or slightly below unity, the information from each station, after appropriate filtering, is made available to all other connected stations without loss. This closed ring of cascaded amplifiers produces a lossless conference arrangement.

In order to utilize such a lossless conference circuit in a time division multiplex system, means must be provided to control the closing of the conference circuit time division switches during the conference time slots of each repetitive cycle. In the prior art, electronic circuits have been suggested which may be adapted to this purpose. For example, a recirculating delay line may be used to store the conference time slot information for connecting a number of stations engaged in a conference in repetitive cycles. A ring counter is stepped under control of the pulse sequence from the recirculating delay line. The ring counter is used to control the selective closing of switches that sequentially connect reactive storage elements to each other and to a common communication bus so that there is a transfer of sampled information between a plurality of stations engaged in a conference.

Such an arrangement is subject to crosstalk between line connections occurring in adjacent time slots. The crosstalk occurs because of incomplete transfer of sampled information energy and residual information energy remaining on the common communication bus of the system at the end of each time slot. The residual sampled information energy from one time slot can then be transferred to the stations connected in the next time slot. Where there is a fixed relationship between the station line connections within each repetitive cycle, all stations including those engaged in conferences are subject to adjacent time slot crosstalk.

Station connection information can be arranged in interleaving groups to reduce adjacent time slot crosstalk. It has been proposed in the application of H. S. Feder, Ser. No. 295,379, filed July 16, 1963, now U.S. Patent No. 3,324,246, issued June 6, 1967, to arrange station connection information in two groups of stores which contain unequal numbers of store positions. By selecting successive station connection information alternately from each of these stores, the station connections can be arranged in a mutually precessing sequence. This results in a substantial reduction of adjacent time slot crosstalk since line connections occur in adjacent time slots much less frequently because of the precessing sequence. Also, the signal information energy due to adjacent time slot crosstalk comes from a plurality of independent station connections. Thus, the crosstalk picked up is made more incoherent and less objectionable to station subscribers.

In view of the foregoing, it is an object of this invention to provide an improved circuit for controlling the lossless conferencing of stations in a time division multiplex communication system.

It is another object of this invention to provide an improved electronic circuit for controlling the connections between a multiport conference circuit and the common communication bus of a time division multiplex communication system.

It is another object of this invention to provide an electronic circuit for controlling the conferencing of stations in a time division multiplex communication system wherein the sequence of station interconnections is arranged to suppress crosstalk between adjacent time slots of each repetitive cycle.

In accordance with one specific embodiment of this invention, a single conference address controls the connections between a multiport conference circuit and the common communication bus of a time division multiplex communication system. The conference address is inserted into a plurality of positions of first and second stores, which positions also contain the addresses of the stations engaged in the conference. This stored information is utilized to control station interconnections in an alternating, mutually precessing sequence. The occurrences of the conference address at the output of the stores are used to register distinct counts in counter circuits corresponding to the stores. Each of the ports of the multiport conference circuit is assigned to one of the stores and the ports so assigned to one store are successively connected to the common communication bus in accordance with the decoded states of the corresponding counter circuit. The output of the counter circuit assigned to the first store is decoded in an ascending sequence from its lowest state, e.g., 0, 1, 2. The output of the counter circuit assigned to the second store is decoded in an ascending sequence from a state equal to the highest state attained by the first store counter circuit, e.g., 3, 4, 5. The ports assigned to one store are thereby opened in a mutually precessing manner with respect to the ports assigned to the other store. The counter circuit assigned to the first store is reset to its lowest state during the time slot corresponding to the last position of the first store. The counter circuit assigned to the second store is reset to an initial state equal to the highest state attained by the first store counter circuit in the time slot associated with the last position of the second store.

In accordance with another specific embodiment of this invention, the first store counter circuit is decoded in an ascending sequence from its lowest state; e.g., 0, 1, 2, etc., and the second store counter is decoded in a descending sequence from its highest state; e.g., 6, 5, etc., thereby connecting ports assigned to each store in a mutually precessing sequence with respect to the connections of ports assigned to the other store. Both counter circuits are reset to their lowest states during the time slots associated with the last position of its respective store.

It is a feature of this invention that a multistate counter records a code corresponding to the number of occurrences of a single conference address at the output of one of a plurality of stores controlling station connections of a time division multiplex communication system in an alternating, mutually precessing manner.

It is another feature of this invention that a control circuit enables the ports of a multiport conference circuit assigned to one store to be successively connected to the common communication bus of a time division multiplex communication system in a mutually precessing relationship with respect to the ports of the multiport conference circuit assigned to other stores.

It is another feature of this invention that the ports assigned to one store controlling station connections in a mutually precessing sequence connect only stations engaged in a conference assigned to that store in a successive sequence to the common communication bus of a time division multiplex communication system.

It is another feature of this invention that each port assigned to one store of a plurality of stores controlling station connections in a mutually precessing sequence is connected to one preassigned conference station through the common communication bus of a time division multiplex communication system.

A complete understanding of these and other features of this invention may be obtained from consideration of the following detailed description together with the accompanying drawings in which.

Figure 1:
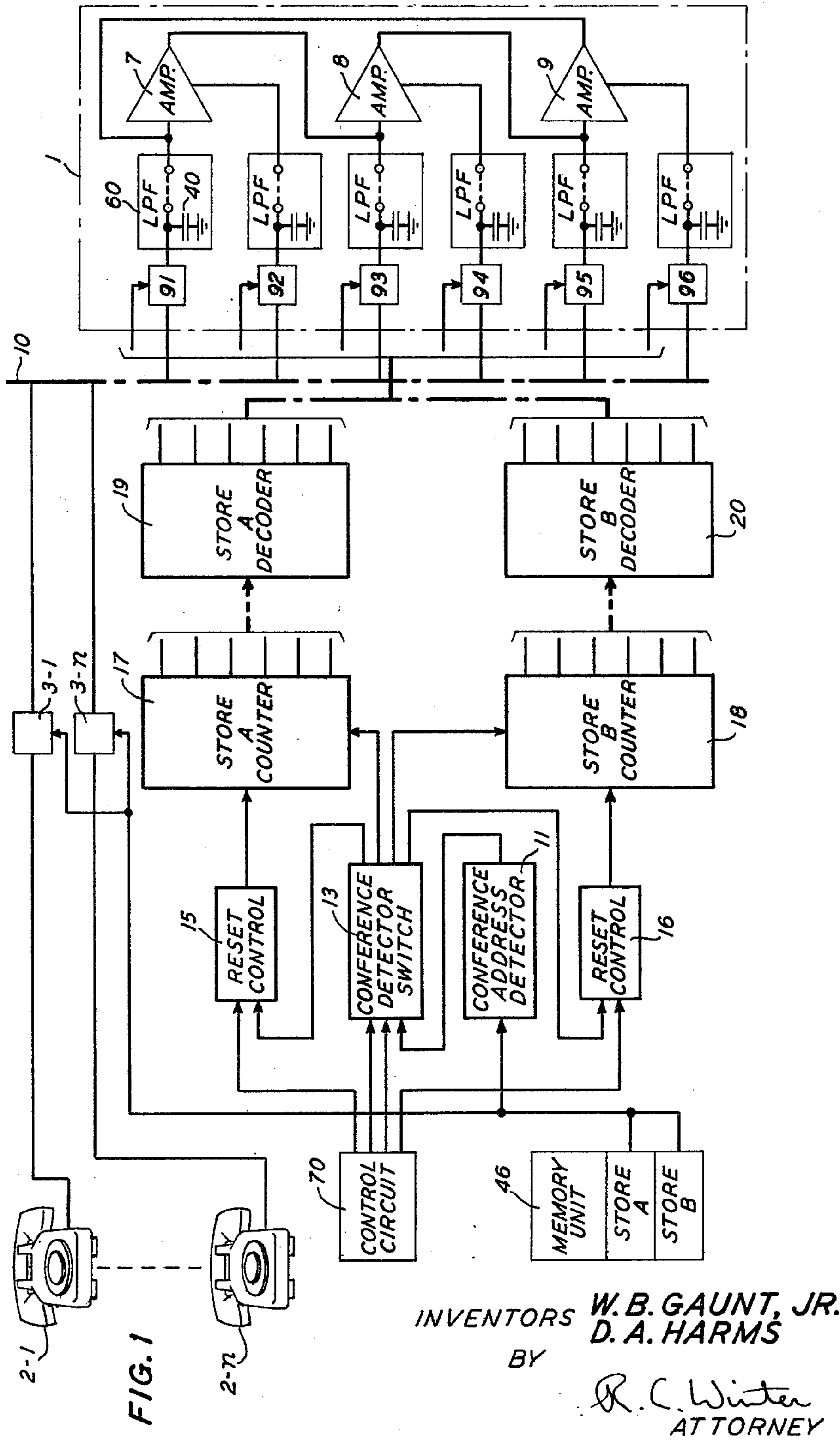
FIG. 1 is a general block diagram of a circuit for controlling the connections between a multiport conference circuit, the common communication bus, and stations of a time division multiplex communication system in accordance with this invention.

Referring to FIG. 1, the novel conference control arrangement is disclosed in the environment of a telephone system. A lossless multiport conference circuit 1, of the type disclosed in the aforementioned W. B. Gaunt, Jr., application Ser. No. 421,316, now U.S. Patent No. 3,423,-538, issued Jan. 21, 1969, comprises a closed loop of three cascaded amplifiers 7, 8, and 9. Three amplifiers are chosen by way of example, but any number of amplifiers may be used. The output of amplifier 7 is connected to an input of amplifier 8, the output of which is connected in turn to an input of amplifier 9. The output of amplifier 9 is connected to an input of amplifier 7, thereby closing the loop of the cascaded amplifiers. By maintaining the gain of each amplifier at or slightly below unity, input signals at any of the amplifiers are recirculated without loss and without oscillatory regeneration.

The common communication bus 10 is connectable to amplifier 7 through a pair of time division switches 91 and 92. Amplifiers 8 and 9 are connectable to bus 10 in similar fashion.

The closing of any one of the time division switches transfers signal information energy present on bus 10 to the cascaded amplifier loop of the multiport conference circuit. The signal information energy appears on bus 10 as a succession of sampled information pulses. These pulses are received in energy storage capacitors connected to the closed time division switches. The storage capacitors each form part of a low pass filter which presents an audio signal to one port of the multiport conference circuit in response to the succession of sampled information pulses. This audio signal is then transmitted through the closed amplifier loop so that its energy is placed on the storage capacitors connected to the remaining time division switches. Information energy stored in the storage capacitor connected to the closed time division switch is also transferred to bus 10. A similar interchange of sampled information pulses occurs between bus 10 and stations such as 2–1 and **2–*n* via the corresponding switches 3–1 and 3–*n***.

For example, the closing of switches 3–1 and 91 connects bus 10 to station 2–1 and to a terminal of amplifier 7 via low pass filter 60. Signal information energy on capacitor 40 connected to switch 91 is transferred to station 2–1 via bus 10, and sampled signal information energy from station 2–1 via bus 10 is stored on capacitor 40 and transmitted through amplifier 7, 8, and 9 to the storage capacitors connected to the remaining time division switches.

The common communication bus 10 is part of a time division multiplex communication system which transfers samples of information during a plurality of time slots occurring in repetitive cycles. Store A and store B may be included in a memory unit 46 which controls station interconnections via bus 10. Store A and store B of memory 46 each contains call address information arranged in adjacent discrete positions, each position containing a calling and called station address.

Store A contains one more position than store B and the total number of storage positions in store A and store B is equal to the number of time slots in each repetitive cycle. The call address information stored in each position is made available alternately from store A and store B during the time slots of each repetitive cycle to effect successive interconnections of pairs of stations via switches 3–1 through **3–*n***. The alternation between the unequal stores A and B results in a precession of connections involving store B with respect to the connections involving store A. Thus, in any repetitive cycle the order of occurrence of the stored call addresses of store A with respect to those of store B differs from that of the previous cycle, and any adjacent channel crosstalk that may occur is reduced by the precession to nonintelligible noise at a relatively low level.

The circuit in accordance with this invention for controlling the closing of time division switches 91 through 96 comprises conference address detector 11 connected between conference detector switch 13 and the output lines of stores A and B, which stores determine station connections in an alternating, mutually precessing manner. The occurrence of a conference address at the output of either store A or store B is detected in conference address detector 11 which generates a signal in response thereto. At the same time the conference address is sent to detector 11, a station address is also transmitted from memory unit 46 to one of switches 3–1 through **3–*n* in accordance with well known principles. Switch 13 is connected between detector 11 and store A counter 17 and store B counter 18**.

Signals from control circuit 70 determine the path through switch 13 of the signal generated in detector 11 to counters 17 or 18, in accordance with the store from which the conference address is transmitted. Counter 17 accepts signal pulses from switch 13 responsive to the occurrence of the conference address at the output of store A. Counter 18 accepts pulses from switch 13 which correspond to the occurrence of the conference address at the output of store B. Counters 17 and 18 change state upon receipt of each signal from switch 13. Counter 17 is reset to an initial state by reset control 15, and counter 18 is reset to an initial state by reset control 16. It is to be understood that other devices known in the art may be used in place of counters. For example, registers, the output code of which is modified in accordance with the number of occurrences of the conference address, can be substituted for counters 17 and 18.

In accordance with one specific embodiment to be described, counter 17 is reset to its lowest state and counter 18 is reset to one state higher than the highest state attained by counter 17 in the conference connection. In another specific embodiment to be described, both counters 17 and 18 are reset to their lowest states.

The output of counter 17 is connected to store A decoder 19 which is further connected to the time division switches in conference circuit 1. Similarly, counter 18 is connected to store B decoder 20 which is also connected to the time division switches in conference circuit 1. The output of decoder 19 controls the closing of the time division switches in accordance with the output code from counter 17, while the output of decoder 20 selectively closes the time division switches in accordance with the output code from counter 18.

Detector 11 transmits a clocking signal during each time slot of the repetitive cycle in which a conference address is transmitted from the call address memory 46. The clocking signal is sent to switch 13. If the time slot during which the conference address occurs is associated with store A, the generated pulse is directed to the input of counter 17 by a control signal from control circuit 70. Alternatively, if the conference address was transmitted from store store B, the clocking signal is directed to counter 18 in response to another control signal from control circuit 70. Thus, during each repetitive cycle, the conference address from positions of store A produces a successive sequence of changes in state of counter 17, and the conference address from positions of store B produces a similar successive sequence of states in counter 18.

Decoder 19 decodes the output state of counter 17 so that one of its outputs is effective to close one of the time division switches in conference circuit 1 in accordance with the state of counter 17. Since counter 17 is augmented in a regular sequence, these switches can be alerted in order from the outputs of decoder 19. Consider, for example, that the addresses of three stations engaged in a conference are contained in store A. In this case switch 91 is alerted first. After the occurrence of the next conference address in store A, switch 92 is alerted and after the next conference address in store A, switch 93 is alerted.

Decoder 20 may be operated in a reverse sequence with respect to the state of counter 18. Thus if the addresses of three other stations engaged in the same conference are contained in store B, switch 96 may be alerted first, switch 95 second, and switch 94 last. In this manner, the time division switches 94 through 96 can be closed in reverse order in a conference involving six stations, three of which are associated with store A and three of which are associated with store B. The ports assigned to switches 91 through 93 are operated in accordance with the occurrence of the conference address in store A, while the ports assigned to switches 94 through 96 are operated in accordance with the occurence of the conference address in store B. The precession of station connections between store A and store B is retained with respect to the stations connected through the multiport conference circuit 1. Also, the time division switches selectively closed in response to the conference address in store A are each assigned to a particular station associated with store A, and the time division switches closed in response to the conference address in store B are similarly each assigned to a particular store B station.

In the above described control circuit, counters 17 and 18 are each reset to their lowest states, e.g., their "0" states, during the time slots assigned to the last position of their respective stores. Thus, reset control 15 generates a signal which resets counter 17 to the "0" state during the time slot corresponding to the last position of store A and reset control 16 resets counter 18 to the "0" state during the time slot corresponding to the last position of store B.

An alternative arrangement may be used in which counter 17 is reset to its lowest state but counter 18 is reset to an initial state which is one greater than the highest state attained by counter 17. Assume again that three stations engaged in a conference are associated with store A and three are associated with store B. Decoder 19 then operates to connect time division switches 91 through 93 sequentially upon receipt of the conference address from store A, and decoder 20 operates to connect time division switches 94 through 96 in the same order in accordance with the sequence of states of store B counter 18. Reset control 16, of course, must contain information to reset counter 18 during the time slot corresponding to the last position of store B, and this information must be transferred from reset control 16 to counter 18 in that time slot.

Figure 2:
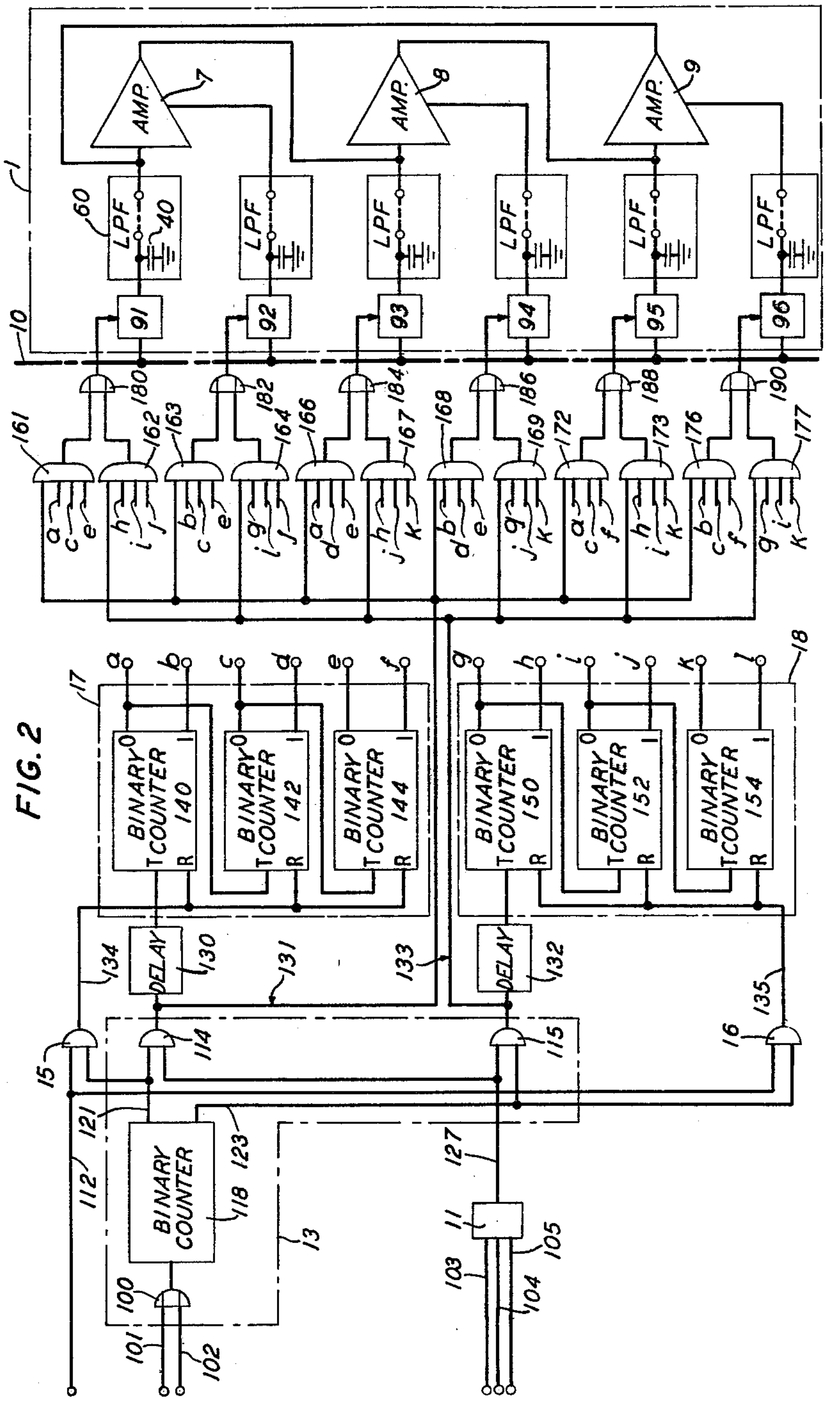
FIG. 2 is a detailed schematic representation of one form of the control circuit depicted in FIG. 1.

FIG. 2 depicts the six-port conference control circuit in greater detail. Thus, conference address detector 11 may appropriately comprise a plurality of gates to accept multibit address codes in accordance with techniques well known in the art; binary counter stages 140, 142, and 144 are connected to form store A counter 17; binary counter stages 150, 152, and 154 are connected to form store B counter 18; store A decorder 19 comprises AND gates 161, 163, 166, 168, 172, and 176, and store B decoder 20 comprises AND gates 162, 164, 167, 169, 173, and 177; reset controls 15 and 16 each comprise an AND gate; and OR gate 100, binary counter 118 and AND gates 114 and 115 form the conference detector switch 13.

Detector 11 accepts call address information from stores A and B via cables 103 and 104, and clocking information from cable 105. If the conference address is received, detector 11 applies a pulse to AND gates 114 and 115 via line 127. The other input to gate 114 is received from binary counter 118 via line 121. In time slots when call address information is transmitted from store A, the state of binary counter 118 will be such that the voltage applied to line 121 permits passage of signals through AND gate 114. The state of binary counter 118 will be reversed in time slots in which store B controls connections.

Each time slot is divided into two portions. During the first portion, a resonant transfer of signal information energy takes place between two stations selectively connected through the common communication bus. In the case of a connection between a station and the multiport conference circuit, there is a resonant transfer of information from one storage capacitor, e.g., capacitor 40 of low pass filter 60, via the selected one of time division switches 91 through 96 through bus 10 to a selected conference station. The second portion of each time slot is a guard interval which prevents residual signal information remaining from a connection in one time slot to interfere with the connection in the succeeding time slot. During the guard interval, residual signal information energy left on the common communication bus is discharged. The discharge of information energy is generally incomplete so that intelligible energy remains during succeeding time slots.

In order to close one of switches 91 through 96 in the resonant transfer interval, binary counter 118 must change state in the preceding guard interval. A signal appears on line 101 during the guard interval preceding the time slot in which information from store A is used. This signal is applied to binary counter 118 via OR gate 100 to change the state of binary counter 118 so that AND gate 114 is alerted and AND gate 115 is inhibited. A signal appears on line 102 during the guard interval preceding a time slot in which information from store B is used. It is applied through OR gate 100 to binary counter 118 to reverse the state of binary counter 118 so that AND gate 115 is alerted and AND gate 114 is inhibited. Since information from store A and information from store B are alternately used to control line connections, these signals reverse the state of binary counter 118 during each guard interval.

Output pulses from AND gate 114 appear on line 131 during each time slot in which a conference address is applied to conference address detector 11 from store A. This pulse is applied to the output decoder gates 161, 163, 166, 168, 172, and 176 which form the store A decoder 19. In this manner the decoded state of counter 17 is permitted to be applied selectively to one of the time division switches 91 through 96 assigned to store A.

A pulse is applied to line 133 each time the conference address occurs at the output of store B. This pulse is applied to all of the output decoder gates 162, 164, 167, 169, 173 and 177 forming the store B decoder 20 so that the state of counter 18 appropriately selects one of the time division switches 91 through 96 assigned to store B.

The output pulse from AND gate 114 is applied to counter 17 through delay 130. This delay is sufficient to permit the decoded states of stages 140, 142, and 144 from gates 161, 163, 166, 168, 172, and 176 to close the previously selected time division switch during the resonant transfer portion of the time slot. In like manner the output pulse from AND gate 115 is applied to counter 18 through delay 132 to delay the change of state of stages 150, 152, and 154 so that the pulse applied to output decoder gates 162, 164, 167, 169, 173, and 177 can act to close the previosuly selected time division switch associated with counter 18. The states of counters 17 and 18 can only be changed during a guard interval following the application of the conference address signal to AND gate 11.

Pulses from delay 130 are applied to the toggle input T to binary counter stage 140. As is well known in the art, a pulse input to the toggle terminal of an appropriately designed binary counter can unconditionally change its state. A change of state of terminal *a* of binary counter 140 may cause a negative voltage transition at that terminal. This transition is applied to input T of stage 142 to change the state of that stage. Each change of state involving a negative transition a terminal *c* of stage 142 is applied to input T of stage 144 to change the state of that stage. This particular mode of binary counter operation is described by way of example and it is to be understood that other counting means known to the art may be used. Counter 18 operates in the same manner as counter 17 in response to pulses from delay 132. Thus, counter 17 records the number of occurrences of the conference address at the output of store A and counter 18 records the occurrence of the conference address in store B during each repetitive cycle.

OR gates 180, 182, 184, 186, 188, and 190 permit the output signals from the decoder AND gates to be applied to the time division switches connected between the multiport conference circuit and common communication bus 10. OR gate 180 permits operation of time division switch 91 if AND gate 161 is enabled in response to the conference address being detected during a time slot assigned to store A. OR gate 180 also passes a pulse to close time division switch 91 when terminals *h*, *i*, and *j* of binary counters 150, 152, and 154 are alerted to permit passage of a pulse from line 133 in response to the occurrence of the conference address in a time slot assigned to store B. In similar fashion, OR gates 182, 184, 186, 188, and 190 each permits the closing of a corresponding time division switch.

In order to describe the operation of the electronic conference control circuit of FIG. 2, assume that there are 33 positions in which connections are made from store A and 32 positions in which connections are made from store B. Further assume that six stations engaged in a conference have their addresses stored, together with the conference address, in assigned positions in stores A and B. Thus, for example, the address of the first conference station 2–1 may be located in position 1 of store A, the second station 2–2 in position 3 of store A, the third station 2–3 in position 5 of store A, the fourth station 2–4 in position 6 of store A, the fifth station 2–5 in position 2 of store B, and the sixth station 2–6 in position 4 of store B.

Table I shows the conference connection information of stores A and B in the illustrative example. The first column lists the time slots required for each repetitive cycle. Since there are 33 positions in store A, 66 time slots are needed to complete the cycle. The remaining columns illustrate the order in which the individual store positions are accessed in three successive cycles, and designate the stations involved in the conference. For example, the designation 1A(CA, 1), appearing in time slot 1 of each cycle, indicates that the content of position 1 of store A; viz., the conference address CA and the address of the first station 2–1, is retrieved in the first time slot of each cycle.

It is to be noted in this example that the content of positions of store A is retrieved in successive odd time slots and the content of positions of store B is retrieved in successive even time slots. Since the number of positions in store A is one greater than the number of positions in store B, the time slots in which positions of store B occur are precessed. Thus, during the first cycle, the fifth station 2–5 is connected in time slot 4, but in the second cycle, the fifth station 2–5 is connected in time slots 2 and 66, and in the third cycle, the fifth station 2–5 is connected in time slot 64. This is so because the occurrence of position 2 of store B is precessed one position during each cycle. The positions of store A, however, occur in the same time slot during successive cycles of operation. If the time slots were arranged in accordance with the positions of store B, the positions of store A would appear to precess in Table I.

Reset of counter 17 takes place in the last time slot of the cycle of operation. This is indicated on Table I as occurring in time slot 65 of each cycle. Reset of counter 18 occurs in the time slot corresponding to the last position of store B. This is indicated on Table I as occurring in time slot 64 of cycle 1, time slot 62 of the second cycle and time slot 60 of the third cycle.

In order to facilitate an understanding of the principles of this invention, only three cycles are shown on Table I. It is to be noted that the precession of store B positions is completed at the end of every 32 cycles. The number of store positions and time slots per cycle on Table I are given by way of example only. Many different arrangements may be made in accordance with the principles of this invention.

TABLE I

| Time Slot | First Cycle | | Second Cycle | | Third Cycle | |
|---|---|---|---|---|---|---|
| 1 | 1A | (CA, 1) | 1A | (CA, 1) | 1A | (CA, 1) |
| 2 | 1B | | 2B | (CA, 5) | 3B | |
| 3 | 2A | | 2A | | 2A | |
| 4 | 2B | (CA, 5) | 3B | | 4B | (CA, 6) |
| 5 | 3A | (CA, 2) | 3A | (CA, 2) | 3A | (CA, 2) |
| 6 | 3B | | 4B | (CA, 6) | 5B | |
| 7 | 4A | | 4A | | 4A | |
| 8 | 4B | (CA, 6) | 5B | | 6B | |
| 9 | 5A | (CA, 3) | 5A | (CA, 3) | 5A | (CA, 3) |
| 10 | 5B | | 6B | | 7B | |
| 11 | 6A | (CA, 4) | 6A | (CA, 4) | 6A | (CA, 4) |
| 12 | 6B | | 7B | | 8B | |
| ⋮ | ⋮ | ⋮ | ⋮ | ⋮ | ⋮ | ⋮ |
| 60 | 30B | | 31B | | 32B | counter 18 reset |
| 61 | 31A | | 31A | | 31A | |
| 62 | 31B | | 32B | counter 18 reset | 1B | |
| 63 | 32A | | 32A | | 32A | |
| 64 | 32B | counter 18 reset | 1B | | 2B | (CA, 5) |
| 65 | 33A | counter 17 reset | 33A | counter 17 reset | 33A | counter 17 reset |
| 66 | 1B | | 2B | (CA, 5) | 3B | |

As previously indicated, stages 140, 142, and 144 which form counter 17 have been reset during the previous repetitive cycle to their "0" states, and stages 150, 152, and 154 forming counter 18 have also been reset to their "0" states. Thus, binary stages 140, 142, 144, 150, 152, and 154 are in their "0" states and the voltages at terminals *a*, *c*, *e*, *g*, *i*, and *k* are low corresponding to their enable state and terminals *b*, *d*, *f*, *h*, *j*, and *l* are high corresponding to their inhibit state. Since all of the inputs to AND gate 161 are in their enable state, this gate permits passage of a pulse from line 131 during the next time slot in which the conference address occurs in store A. Gate 177 also has all of its inputs *g*, *i*, and *k* in their enable states so that the next conference address occurring at the output of store B will generate a pulse in detector AND gate 11 which will pass through gate 115, over line 133, and through gate 177. All of the other output decoder AND gates are inhibited by at least one input from either counter 17 or counter 18.

During this cycle, i.e., the first cycle according to Table I, position 1 of store A will be read out in the first time slot and position 1 of store B will be read out in the second time slot. Position 1 of store A contains the conference address CA and the address of the first station 2–1. At the beginning of time slot 1 of the first cycle, the conference address is applied via cables 103, 104, and 105 to detector 11 so that the output of detector 11 is in its enable state. The conference address includes a timing pulse, the duration of which permits closing of a selected one of time division switches 91 through 96 to appropriately transfer signal information from bus 10 to multiport conference circuit 1. During the guard interval of the previous time slot, a signal was applied via line 101 and OR gate 100 to binary counter 118 to reverse the state thereof. The voltage on line 121 is now low to enable gate 114, and the voltage on line 123 is now high to inhibit gate 115. Since AND gate 115 is inhibited, none of the output decoder gates associated with store B can be operated. But AND gate 114 is alerted by the signal on line 121. Thus the pulse at the output of AND gate 11 can be applied via line 131 to AND gate 161 and therethrough to close switch 91 via OR gate 180. The closing of switch 91 permits the information energy stored on capacitor 40 of filter 60 to be transferred to bus 10 and information energy on bus 10 from conference station 1 to be transferred to capacitor 40 and as previously described to the other storage capacitors.

In the second portion of time slot 1, after information energy has been transferred between capacitor 40 and bus 10, counter 17 is augmented. This is done through delay 130, which delay permits the transfer of signal information during the first portion of the time slot assigned to the closing of time division switch 91. The delayed pulse from delay 130 is applied to input T of binary counter stage 140. During the negative transition of this pulse, stage 140 will change state so that the voltage at terminal *b* is low corresponding to its enable state and the voltage at terminal *a* is high corresponding to its inhibit state. There is no negative transition of voltage at terminal *a* during this interval. Consequently, the state of stage 142 remains unchanged. The state of stage 144 is unaffected since there is no voltage change at terminal *c*. Thus, at the end of time slot 1, the voltages at terminals *b*, *c*, and *e* are low corresponding to their enable states and the voltages at terminals *a*, *d*, and *f* are high corresponding to their inhibit states. Binary counter stages 150, 152, and 154 remain unchanged and the state of binary counter 118 corresponds to the store A position.

During the guard interval of time slot 1, a signal is applied to binary counter 118 through line 102 and OR gate 100. This signal changes the state of binary counter 118 so that a low voltage is applied to AND gate 115 through line 123 and a high voltage is applied through line 121 to AND gate 114. AND gate 115 is alerted to pass a pulse from detector 11 in time slot 2. But Table I shows that there is no conference address in position 1 of store B. Therefore, the conference control circuit is not effective to close a time division switch in time slot 2 and the state of counter 18 is unchanged. In the guard interval of the second time slot, a signal through line 101 and OR gate 100 again reverses the state of binary counter 118 so that AND gate 114 is alerted. In the absence of a conference address in position 2 of store A there are no changes produced in the conference control circuit during time slot 3.

In the guard interval of time slot 3, the state of binary counter 118 again is changed so that AND gate 115 is alerted and AND gate 114 is inhibited. A conference address is contained in the second position of store B which is read out in time slot 4, and a pulse from detector 11 passes through alerted AND gate 115 to the decoder output gates 162, 164, 167, 169, 173, and 177 to permit the output state of store B counter 18 to be sampled. No pulse has been received from store B up to time slot 4 of the first cycle at the toggle input of stage 150 so that only output terminals *g*, *i*, and *k* are in their enable states. This condition results in alerting AND gate 177 to pass the conference address pulse from line 133 through OR gate 190 to time division switch 96. The conference address pulse closes time division switch 96 and information is transferred between its associated storage capacitor and bus 10. Since the fifth station 2–5 is connected to bus 10 at this time, the signal information on this capacitor is transferred to conference station 2–5. Thus, in time slot 4, station 2–5 receives the signal information which was applied to the multiport conference circuit from station 2–1 during time slot 1.

The pulse from AND gate 115 is also applied to delay 132 to change the state of binary counter stage 150 after the transfer of signal information through switch 96 is completed. The application of the delayed pulse from delay 132 causes stage 150 to change state during the negative transition of the pulse applied thereto. The voltage on terminal *g* changes to a high voltage corresponding to the inhibit state and the voltage on terminal *h* changes to a low voltage corresponding to the enable state. Since no negative voltage transition occurs on terminal *g*, stage 152 does not change state and stage 154 is unaffected. At the end of time slot 4, counter 18 has terminals *h, i,* and *k* in their enable states and terminals *g, j,* and *l* in their inhibit states. Counter 17 is not changed during time slot 4 because of the inhibition on gate 114 from binary counter 118.

At the end of time slot 11, information has been transferred in the manner described between the conference circuit and each of the conference stations. There is no further transfer of conference signal information energy until time slot 1 of the second cycle. Intime slots 12 through 63 of the first cycle, the conference control circuit does not act to close any time division switch. Only binary counter 118 reverses state at the end of the guard interval of each of these time slots.

At the end of time slot 63, terminals *a, c,* and *f* of counter 17 and terminals *g, j,* and *k* of counter 18 are in their enable states. In the guard interval of time slot 63, counter 118 reverses its state so that AND gate 114 is inhibited and AND gates 115 and 16 are alerted.

During time slot 64, the last position of store B (32B) is read out. This last position is reserved for scanning, an operation well known in the art. No line connections take place in the scanning time slot. Since no conferece address CA can occur in position 32 of store B, reset of counter 18 is permitted. Prior to the appearance of a signal on lead 101 in time slot 64, a signal is applied to line 112 to reset binary counter stages 150, 152, and 154. This reset signal is applied to one input of AND gate 16, which gate has been alerted via line 123 from binary counter 118. The output of AND gate 16 is applied to reset terminals R of stages 150, 152, and 154 to switch the corresponding binary counter stages 150, 152, and 154 to their "0" states. Thus, at the end of time slot 64, terminals *g, i,* and *k* of store B counter 18 are in their enable states and terminals *h, j,* and *l* are in their inhibit states. The state of binary counter 118 also is reversed in this guard interval.

At the start of time slot 65, binary counter 118 has alerted AND gate 15. Time slot 65 is also reserved for scanning since the last position of store A is being addressed. The reset signal again is applied to lead 112, prior to the occurrence of a signal on lead 102. This time it serves to reset binary counter stages 140, 142, and 144. Thus terminals *a, c,* and *e* are put into their enable states while terminals *b, d,* and *f* are put in their inhibit states.

Thus, in the last time slot assigned to store A, i.e., time slot 65, counter 17 comprising stages 140, 142, and 144 has been reset to its lowest state. Also, in the last time slot assigned to store B, i.e., time slot 64, counter 18 comprising stages 150, 152, and 154 has been reset to its lowest state. Therefore, the first time division switch to be closed in the second cycle as a result of an occurrence of the conference address in store A is switch 91, and the first time division switch to be closed in cycle 2 as a result of the conference address information in store B is switch 96.

In time slot 1 of the second cycle, the conference address in position 1 of store A causes capacitor 40 to be connected to bus 10 and therethrough to station 2–1 via switch 91 as in the previous cycle. Station 2–5 is next connected to the common communication bus and a conference storage capacitor is connected thereto via switch 96 in the manner described in cycle 1. Since the positions of store B are processed with respect to store A, this connection takes place in time slot 2 of cycle 2 rather than in time slot 4 as in cycle 1. The connections between station 2–2 and the conference circuit are made in time slot 5 via switch 92 as in cycle 1, but the connection between station 2–6 and the conference circuit through switch 95 is made in time slot 6 rather than time slot 8 as in the first cycle. Again, this is so because of the precession of the positions of store B with respect to store A. Station 2–6 is always connected through switch 95.

At the end of time slot 11 of the second cycle, information has been exchanged between all of the conference lines via the conference circuit under control of the single conference address according to the sequence of Table I. In time slot 62, binary counter stages 150, 152, and 154 are again reset and in time slot 65, binary counter stages 140, 152, and 144 are reset in preparation for the third cycle. Reset of counter 18 occurs in time slot 62 because of the precession of the positions of store B with respect to those of store A.

In time slots 1, 3, 9, and 11 of the third cycle, stations 1, 2, 3, and 4 are connected to the multiport conference circuit in the above-described manner. Because of the precession of the positions of store B, station 2–6 is connected to the conference circuit in time slot 4 through switch 95. After reset of counter 18 in time slot 60 of cycle 3, station 2–5 is connected to the conference circuit via time division switch 96 in time slot 64. The connections during the third cycle are made according to Table I. At the end of time slot 62, stages 150, 152, and 154 have been reset to their "0" states. Stage 150 has been set during the guard interval of time slot 64. In time slot 65 of the third cycle, stages 140, 142, and 144 are reset to their lowest state in preparation for cycle 4. The cycles are repeated in accordance with the precession of the positions of store B with respect to the positions of store A.

It should be noted that the connections between conference stations associated with store A are made independently of the conference station connections associated with store B. Switches 91 through 94 have been used in this example to connect conference stations 1, 2, 3, and 4 through the common communication bus to their assigned conference circuit storage capacitors. Switches 96 and 95 have been used to make connections between stations 2–5 and 2–6 their assigned conference circuit storage capacitors. In each case a time division switch and its associated low pass filter storage capacitor has been used to connect the same station to the multiport conference circuit.

Of course, there may be a different number of conference stations associated with stores A and B than given in the above-described illustrative example. The total number of stations is limited by the number of time division switches of the multiport conference circuit. Thus in the above-described embodiment, if six conference stations were associated with store A, no conference stations could be associated with store B. If two conference stations are associated with store A, up to four conference stations may be associated with store B.

The maximum number of conference stations is also limited by the number of stages in counters 17 and 18. In this embodiment each counter has a maximum of eight states so that eight time division switches and four cascaded amplifiers can be used in the multiport conference circuit.

Figure 3:
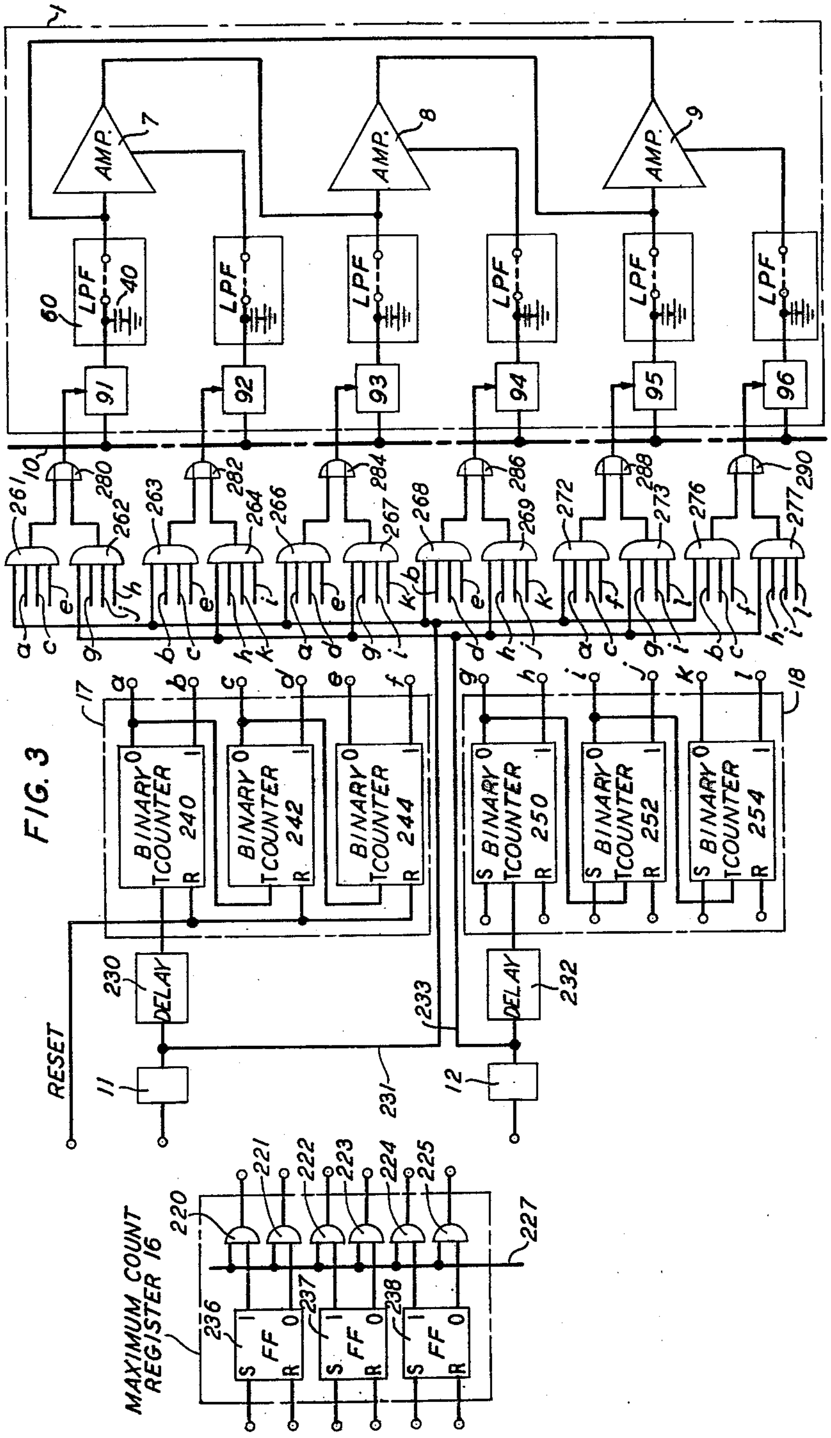
FIG. 3 is a detailed schematic representation of another form of the control circuit depicted in FIG. 1.

In FIG. 3, a specific embodiment of this invention is shown wherein a single conference address from a pair of stores is used to control connections between a common communication bus and a multiport conference circuit 1. The circuit of FIG. 3 is also adapted to control the conference connections of Table I. But, in this specific embodiment, counter 18, comprising stage 250, 252, and 254, is not reset to its lowest state in the time slot corresponding to position 32 of store B. Instead, it is reset to one greater than the highest state to which counter 17 is augmented during each cycle. This number is initially placed in a separate reset register 16. The outputs of flip-flops 236, 237, and 238, which form register 16, are transferred via gates 220 through 225 to the corresponding set and reset terminals of stages 250, 252, and 254 in response to a signal on line 227. The transfer occurs when a reset signal is received in the time slot corresponding to position 32 of store B. In this way, one more than the highest state attained by counter 17 is transferred to counter 18. Therefore, during the first time slot in which the conference address occurs at the output of store B, a time division switch, distinct from the time division switches associated with store A, connects a conference station associated with store B to the conference circuit.

In this embodiment, conference address detector 11 detects the occurrence of the conference address at the output of store A, and conference address detector 12 similarly detects the occurrence of the conference address at the output of store B. It is understood that detectors 11 and 12 represent one of many circuits known in the art for detection of a particular multibit address code. It is also to be understood that the conference address signals from stores A and B each include a clock pulse which is timed to close the selected one of switches 91 through 96 appropriately for reasonant transfer of information signal energy.

Counter 17 controls connections associated with store A through a set of time division switches which is distinct from that associated with store B. In the conference connections shown in Table I, conference stations 2–1, 2–2, 2–3, and 2–4 are associated with store A and conference stations 2–5 and 2–6 are associated with store B. Counter 17 is reset initially to its lowest state, i.e., "0." Counter 18, however, is reset to the highest state of store A, i.e., "4." During the first cycle, counter 17 counts from "0" to "3" and counter 18 counts from "4" to "5." In time slot 64 of the first cycle, counter 18 is reset to "4" in accordance with the information stored in the reset register 16 via transfer gates 220 through 225. In time slot 65, counter 17 is reset to its "0" state. Thus, at the start of the second cycle, counter 17 is in its "0" state, i.e., terminals *a*, *c*, and *e* are in their enable states while terminals *b*, *d*, and *f* are in their inhibit states. Counter 18 is in its "4" state so that terminals *g*, *i*, and 1 are in their enable states and terminals *h*, *j*, and *k* are in their inhibit states.

The state of counter 17 is decoded in AND gates 261, 263, 266, 268, 272, and 276. In the first time slot of any cycle, terminals *a*, *c*, and *e* of stages 240, 242, and 244 are in their enable states and terminals *b*, *d*, and *f* are in their inhibit states. Therefore, AND gate 261 is alerted to pass a signal responsive to the occurrence of a conference address in time slot 1 from detector 11 through OR gate 280 to close switch 91. The occurrence of the single conference address in succeeding time slots of the cycle augments counter 17 in an ascending manner from the "0" state.

AND gates 262, 264, 267, 269, 273, and 277 decode the state of counter 18. In the time slot corresponding to the first position of store B, as indicated, counter 18 is initially set to state "4," which is the highest state attained by counter 17. Terminals *g*, *i*, and *l* are in their enable states and terminals *h*, *j*, and *k* are in their inhibit states so that AND gate 273 is alerted to pass a conference address from detector 12 to OR gate 288. This insures that switch 95 is closed in the first time slot of the cycle in which a conference address associated with store B occurs. Counter 18 is augmented in an ascending sequence and is also decoded in an ascending sequence. Thus, AND gate 273 is alerted in the first time slot assigned to the conference from store B. This corresponds to the connections shown on Table I.

The difference in the operation of the circuits of FIGS. 2 and 3 can be illustrated by considering the events in time slots 4 and 5 of the first cycle as shown in Table I. At the beginning of time slot 4, counter 18 is in the "4" state since no position containing the conference address in store B is accessed during time slots 1, 2, and 3 of this cycle. Since terminals *g*, *i*, and *l* are the only terminals of counter 18 which are enabled, only AND gate 273 is alerted and the conference address from position 2 of store B causes a pulse to appear at the output of detector 12, AND gate 273, and OR gate 288 to close switch 95. Consequently, the station address from store B causes switch 3–5 to close. The closing of switch 95 permits a transfer of energy between its associated capacitor and bus 10 which is connected to station 2–5 at this time. The signal from detector 12 also passes through delay 232 so that counter 18 does change state during the resonant transfer portion of the time slot. The output from delay 232 is applied to terminal T of stage 250 to reverse the state of stage 250. Terminal *g* is put into its inhibit state and terminal *h* is put into its enable state. Stages 252 and 254 remain unaltered because there is no negative voltage transistion at terminal *g* at this time. Terminals *h*, *i*, and *l* are now in their enable states and terminals *g*, *j*, and *k* are in their inhibit states. Thus only AND gate 277 is alerted to pass the next conference address clock pulse from detector 12.

At the start of time slot 5, the conference address is read from position 3 of store A. Counter 17 is in its "1" state because a conference address was read from position 1 of store A during time slot 1. Thus, terminals *b*, *c*, and *e* of counter 17 are in their enable states and terminals *a*, *d*, and *f* are in their inhibit states so that the conference address in store A enables detector 11, AND gate 263, and OR gate 282 to close switch 92. A transfer of energy takes place between the storage capacitor associated with switch 92 and bus 10 which is connected to station 2 in this time slot. The newly acquired information on this capacitor is transmitted to the remaining capacitors via amplifiers 7, 8, and 9 in the above-described manner.

The pulse from detector 11 is delayed through delay 230 and is applied to terminal T of stage 240 after the resonant transfer has taken place. This pulse reverses the state of binary counter stage 240 so that terminal *a* is in its enable state and terminal *b* is in its inhibit state. A negative voltage transition occurs at terminal *c* and is applied to the T terminal of stage 242. This negative transition causes stage 242 to reverse its state so that terminal *c* is put into its inhibit state and terminal *d* is put into its enable state. Since no negative transition takes place at terminal *c*, stage 244 remains unchanged. Terminals *a*, *d*, and *e* are put into their enable states and terminals *b*, *c*, and *f* are put into their inhibit states. Therefore, the occurrence of the next conference address from store A will allow a conference address pulse to pass through the just alerted gate 266.

The circuit of FIG. 3 continues to operate in accordance with the information in store A and store B as shown on Table I, and the connections between bus 10 and the conference circuit are accomplished in accordance with the principles of this invention. The connections between stations 2–1, 2–2, 2–3, and 2–4 associated with store A and the conference circuit are made via switches 91, 92, 93, and 94, respectively. The connections between stations 2–5 and 2–6 are made through switches 95 and 96, respectively. The precession of the positions of store B with respect to the positions of store A provides the sequence of line connections in accordance with the occurrence of the single conference address shown in the second and third cycles of Table I.

It is to be understood that the above-described embodiments are only illustrative of the applications of the principles of this invention. Numerous other arrangements may be devised by those skilled in the art without departing from the spirit and scope of this invention. For example, conference circuit arrangements such as those using multiple storage cell arrays can be controlled in a similar manner. Also, other types of interleaving sequences of information from three or more stores may be accommodated. A single conference address in several stores arranged so that connections are controlled in an interleaved but non-precessing sequence can control the connections between stations and a conference circuit in accordance with the principles of this invention.

What is claimed is:

1. In a communication system, a plurality of stations engaged in a conference, a multiport conference circuit, a common communication bus, first and second different size stores containing information for controlling connections between said stations in an alternating mutually precessing sequence, each of said stores containing a single conference address in each position assigned to said stations, and means for controlling the connection of said conference circuit to said common bus during distinct time slots in a repetitive cycle of time slots to maintain the conference, said controlling means comprising means for detecting the occurrence of said conference address, a first counter circuit for registering a distinct count corresponding to the number of times said conference address is received in said detecting means from said first store, a second counter circuit for registering a distinct count corresponding to the number of times said conference address is received in said detecting means from said second store, and means for successively connecting conference circuit ports assigned to each of said first and second stores to said common communication bus in response to the output of said first and second counter circuits.

2. In a communication system, the combination in accordance with claim 1 further comprising means for altering said first and second counter circuits responsive to the output of said detecting means provided upon receipt of a conference address from the corresponding one of said first and second stores and wherein said means for successively connecting conference circuit ports assigned to each of said first and second stores comprises means jointly responsive to receipt of said detecting means output and the output of the corresponding one of said first and second counter circuits.

3. In a communication system, the combination in accordance with claim 2 wherein said means for successively connecting said conference circuit ports assigned to each of said first and second stores further comprises a first plurality of gates connected to said first counter circuit for decoding the outputs of said first counter circuit and a second plurality of gates connected to said second counter circuit for decoding the outputs of said second counter circuit and wherein each of said conference circuit ports is assigned to only one of said stations.

4. In a communication system, the combination in accordance with claim 3 further comprising means for resetting said first counter circuit to an initial state in the time slots associated with the last position of said first store and means for resetting said second counter circuit in the time slots associated with the last position of said second store.

5. In a communication system, the combination in accordance with claim 3 further comprising means for resetting said first counter circuit to its lowest state and means for resetting said second counter circuit to an initial state greater than the number of said conference circuit ports associated with said first counter circuit during each complete cycle of positions of said first store.

6. In a communication system, the combination in accordance with claim 5 wherein said means for resetting said second counter circuit comprises register means for recording said highest state attained by said first counter circuit.

7. In a communication system, the combination in accordance with claim 3 wherein said first plurality of gates comprises means for decoding the output of said first counter circuit in an ascending sequence from the lowest output code of said first multistate counter and wherein said second plurality of gates comprises means for decoding the output of said second counter circuit in a descending sequence from the highest output code of said second counter circuit whereby the decoded output of said first plurality of gates is always lower than the decoded output of said secondary plurality of gates.

8. An electronic circuit for controlling a conference connection between stations in a time division multiplex system having a plurality of stations, a common communication bus, a multiport conference circuit, and a plurality of different size stores containing information for controlling the interconnection of said plurality of stations in an interleaving sequence, said electronic circuit comprising means for detecting the appearance of a single conference address stored in each position of said stores assigned to said stations engaged in a conference in distinct time slots of a repetitive cycle of time slots, counter means for registering a distinct count corresponding to the number of times the appearance of said conference address is detected by said detecting means from each store, and means connected between said counter means and the ports of said multiport conference circuit and responsive to the output of said counter means for successively connecting said ports assigned to each store to said common communication bus.

9. In a time division switching system, a multiport circuit, a common communication bus and means for controlling connections between said multiport circuit and said common communication bus comprising a plurality of different size stores containing information for controlling connections between said common communication bus and ports of said multiport circuit in a distinct interleaving sequence, said stores containing a multiport circuit connection address in selected positions, means for detecting the occurrence of said address in distinct time slots of a repetitive cycle of time slots, means for registering a code corresponding to the number of times the occurrence of said address is detected by said detecting means, and means connected to said code registering means for successively connecting said ports assigned to each of said plurality of stores to said common communication bus in response to the output of said code registering means.

10. An electronic circuit for controlling connections between ports of a multiport conference circuit and a common communication bus in selected time slots of a time division multiplex switching system comprising a conference address detector responsive to receipt of a single conference address from a plurality of different size stores controlling station connections in an alternating mutually precessing sequence, a plurality of counter circuits for recording the number of times said single conference address is received at said detector from each of said stores, means connected to said counter circuits for successively connecting said ports assigned to each of said stores to said communication bus comprising gating means for decoding the output code of each of said counter circuits, and means connected to said gating means for completing a path between a conference circuit port and said common communication bus.

11. A communication system comprising a plurality of stations, a conference circuit having a distinct port assigned to each of said stations, means for storing the address of said conference circuit together with the address of each of said stations in preassigned positions in interleaving groups of storage positions, a common communication bus to which said stations and the corresponding ports of said conference circuit are connected in sequence during distinct time slots of a repetitive cycle to establish a conference among said stations, and means for controlling the connection of said conference circuit to said bus characterized in that the controlling means comprises means for counting the number of times said conference circuit address is retrieved from each one of said interleaving groups of storage positions, and means operative in response to the count registered in said counting means for connecting each of said conference circuit ports to said bus in sequence.

12. A communication system in accordance with claim 11, characterized in that said counting means comprises a pair of counter circuits each of which receives the conference circuit address from a corresponding one of said groups of storage positions, each of said conference circuit ports being associated with a distinct one of said pair of counter circuits.

13. A communication system in accordance with claim 12, characterized in that said connecting means comprises gating circuits arranged to connect the ports associated with one of said counter circuits to said bus in a first sequence and to connect the ports associated with the other counter circuit to said bus in a sequence distinct from said first sequence.

References Cited

UNITED STATES PATENTS

| | | | |
|---|---|---|---|
| 3,171,896 | 3/1965 | Bartlett et al. | 179—15 |
| 3,324,246 | 6/1967 | Feder | 179—15 |

KATHLEEN H. CLAFFY, Primary Examiner

A. B. KIMBALL, Jr., Assistant Examiner

U.S. Cl. X.R.

179—18